(12) United States Patent
Castillo

(10) Patent No.: US 8,413,862 B2
(45) Date of Patent: Apr. 9, 2013

(54) CLOTHING HANGER DEVICE FOR VEHICLE DECK LID

(75) Inventor: Brian V. Castillo, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 346 days.

(21) Appl. No.: 12/901,617

(22) Filed: Oct. 11, 2010

(65) Prior Publication Data

US 2012/0085799 A1  Apr. 12, 2012

(51) Int. Cl.
   *B60R 7/10* (2006.01)
(52) U.S. Cl.
   USPC .......................................... 224/313; 224/927
(58) Field of Classification Search .................. 224/313, 224/927, 311, 539, 543, 568, 922
   See application file for complete search history.

(56) References Cited

U.S. PATENT DOCUMENTS

| | | | | |
|---|---|---|---|---|
| 1,503,298 A * | 7/1924 | Campbell | ....................... | 211/31 |
| 1,895,208 A * | 1/1933 | Salavsky | ....................... | 206/285 |
| 2,064,087 A * | 12/1936 | Smith | ........................ | 248/205.1 |
| 2,469,068 A * | 5/1949 | Ford | .............................. | 296/37.7 |
| 2,536,293 A * | 1/1951 | Koses | ............................ | 224/482 |
| 2,573,102 A * | 10/1951 | Hennessy | ..................... | 414/462 |
| 2,577,263 A * | 12/1951 | Myers | .......................... | 224/543 |
| 3,209,969 A | 10/1965 | Hennagin | | |
| 3,318,471 A * | 5/1967 | Barr | .............................. | 414/462 |
| 3,473,680 A * | 10/1969 | Downer | ....................... | 414/462 |
| 4,671,556 A | 6/1987 | Lynas | | |
| 4,778,089 A | 10/1988 | White | | |

* cited by examiner

*Primary Examiner* — Justin Larson

(57) ABSTRACT

A hanger device stores clothes on the inside of the deck lid that closes the vehicle trunk. A peg projects from an inner surface of the deck lid for engagement by the hook portion of a clothes hanger when the deck lid is open, so that the clothes hanging on the clothes hanger hang downwardly. An elastic strap has first and second ends, one end attached to the deck lid on one side of the hanging clothes and the other end attached to the deck lid on the other side of the hanging clothes so that the elastic strap holds the clothes against the deck lid during movement of the deck lid between open and closed positions.

19 Claims, 2 Drawing Sheets

CLOTHING HANGER DEVICE FOR VEHICLE DECK LID

FIELD OF THE INVENTION

The present invention relates to a clothes hanger for a motor vehicle and more particularly provides a hanger device for hanging clothes on the inside of the vehicle deck lid.

BACKGROUND OF THE INVENTION

Modern vehicles are provided with a hook on the roof rail in the back seat compartment where the vehicle user can hang clothing hangers, for example when returning home from the dry cleaners. Hanging clothes in the back seat is convenient but may be annoying to a rear seat occupant. In addition, the hangers can become dislodged so that the clothes slide to the floor and become wrinkled or soiled.

It would be desirable to provide a new and improved device for hanging clothing hangers in a vehicle body.

SUMMARY OF THE INVENTION

A hanger device stores clothes on the inside of the deck lid that closes the vehicle trunk. A peg projects from an inner surface of the deck lid for engagement by the hook portion of a clothes hanger when the deck lid is open, so that the clothes hanging on the clothes hanger hang downwardly. An elastic strap has first and second ends, one end attached to the deck lid on one side of the hanging clothes and the other end attached to the deck lid on the other side of the hanging clothes so that the elastic strap holds the clothes against the deck lid during movement of the deck lid between open and closed positions.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and not intended to limit the invention, its application, or uses.

Figure 1:
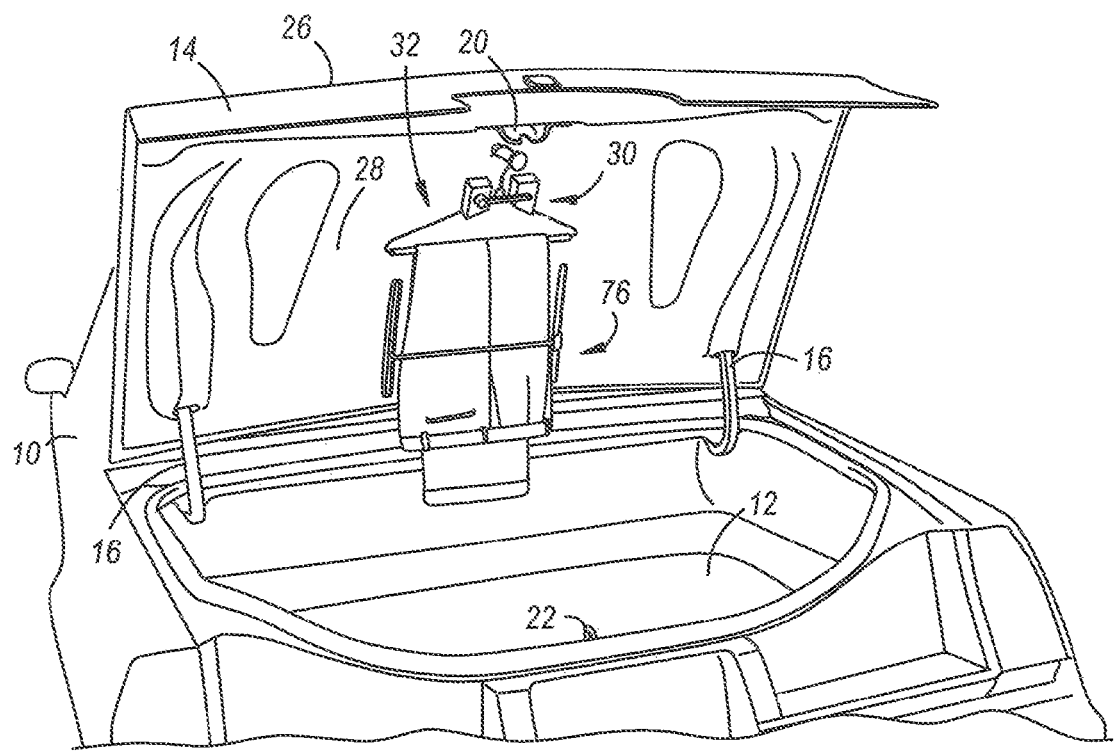
FIG. 1 is a perspective view of a vehicle body having the deck lid open and showing a clothes hanger device provided on the inside of the deck lid.

Vehicle body 10 has a trunk 12 closed by a deck lid 14. Deck lid 14 is mounted on the vehicle body 10 by hinge arms 16 and 18 that permit movement of the deck lid 14 between the open position of FIG. 1 and a closed position in which a deck lid latch 20 engages a striker 22 on the vehicle body 10 to retain the deck lid 14 in its closed position. As seen in FIG. 1, the open position of the deck lid 14 has the deck lid standing up in a generally vertical orientation. The closed position of the deck lid will have the deck lid 14 pivoted down to a generally horizontal position. The deck lid 14 is conventionally constructed and includes an outer panel 26 and an inner panel 28 that are flanged together around their outer edges.

Figure 2:
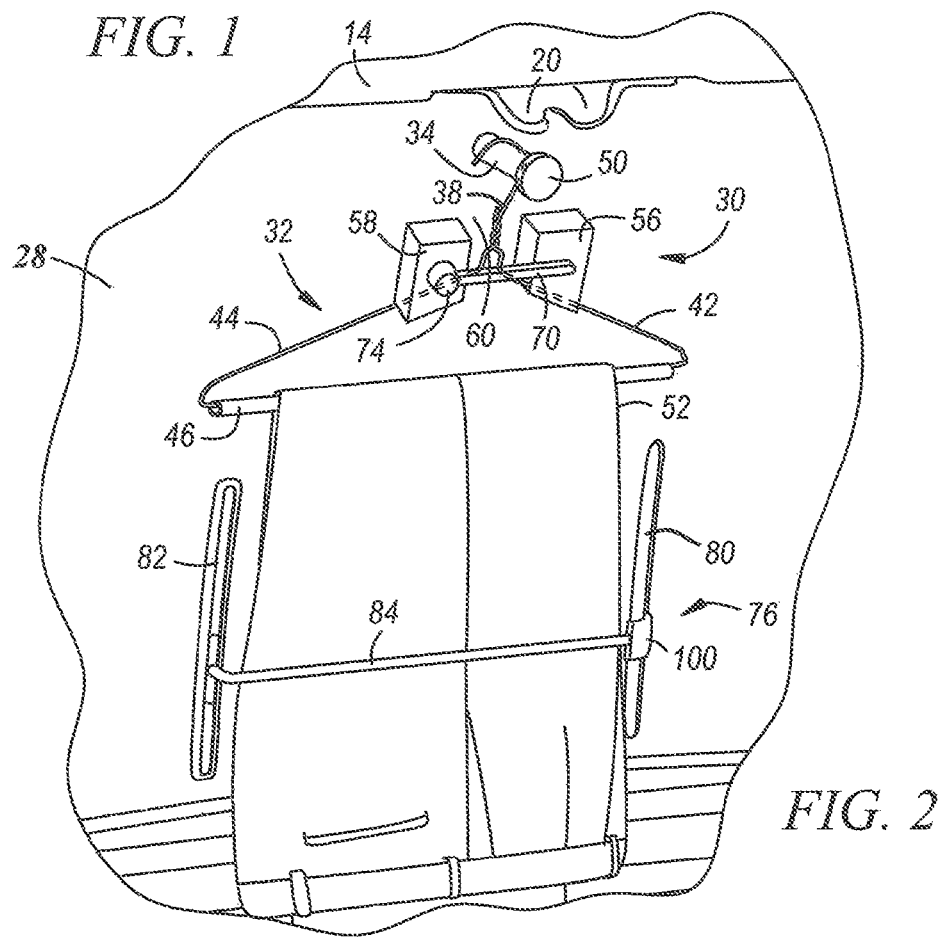
FIG. 2 is a fragmentary enlargement of FIG. 1.

As seen in FIG. 2, a clothes hanger device, generally indicated at 30, is provided on the inside of the deck lid 14. A conventional clothes hanger, generally indicated at 32, hangs upon a peg 34. The clothes hanger 32 is made of wire and includes a hook portion 38 and a triangle-shaped hanger portion that includes a right shoulder support 42, a left shoulder support 44, and a trouser bar 46. The peg 34 projects from the inner panel 28 of the deck lid 14. In FIG. 2, the deck lid 14 is in the open position and, accordingly, the peg 34 extends in a generally horizontal orientation similar to a closet rod. The hook portion 38 of the clothes hanger 32 hooks over the peg 34. The peg 34 has an enlarged knob 50 at the end thereof to assist in retaining the hook portion 38 on the peg 34. The drawings show a pair of trousers 52 hanging on the clothes hanger 32.

Figure 3:
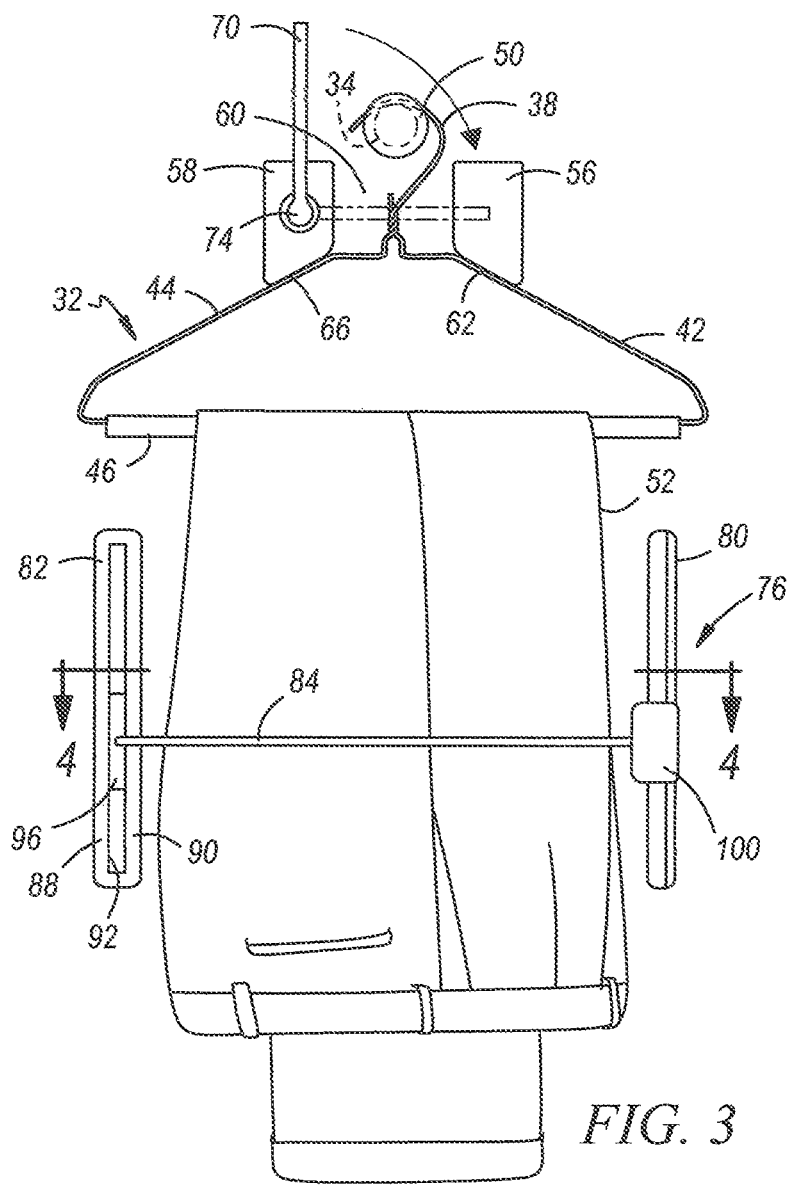
FIG. 3 is similar to FIG. 2 and showing a catch that moves between open and closed positions to retain the hanger on the hanger device.

As best seen in FIGS. 2 and 3, retaining blocks 56 and 58 are attached to the deck lid inner panel 28. The retaining blocks 56 and 58 are spaced apart to provide an opening 60 for receiving the hook portion 38 of the clothes hanger 32. The right-hand retaining block 56 has an angled abutment face 62 that either engages with or closely overlies the right-hand shoulder support 42 of the clothes hanger 32. Likewise, the left-hand retaining block 58 has an angled lower surface 66 that engages or closely overlies the left-hand shoulder support 44 of the clothes hanger 32. As seen in FIG. 3, the position of the retaining blocks 56 and 58 will block the upward movement of the clothes hanger 32 in the upward direction which would allow the hook portion 38 to slip over the knob 50 of peg 34.

As seen in FIGS. 2 and 3, a catch bar 70 is mounted on the retaining block 58 by a pivot 72 that will permit movement of the catch bar 70 from the vertical position shown in FIG. 3, to the horizontal phantom line indicated position of FIG. 3. When the catch bar 70 is at its horizontal position, the catch bar 70 will prevent the hook portion 38 from being removed from the opening 60 between the retaining blocks 56 and 58. The pivot 72 imposes sufficient friction on the catch bar 70 such that the catch bar 70 will be retained by friction at either the horizontal or vertical position but can be readily moved by the user.

Figure 4:
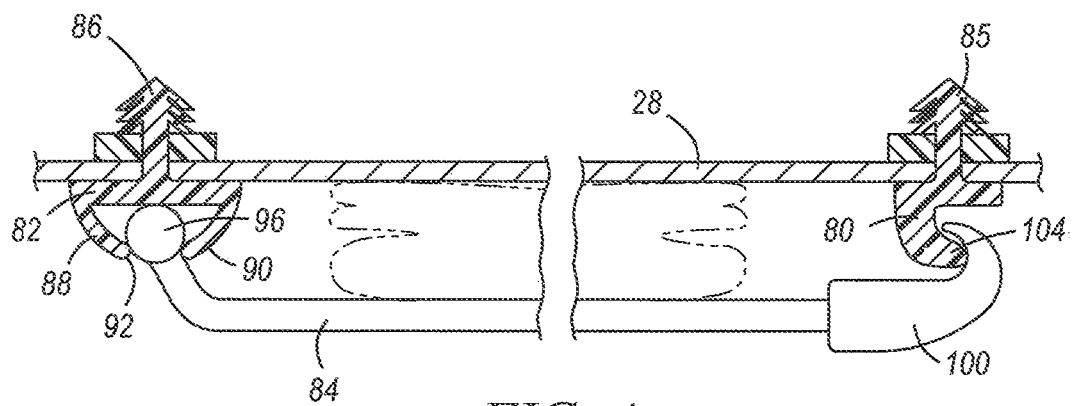
FIG. 4 is a sectional view taken in the direction of arrows 4-4 of FIG. 3.

As seen in FIGS. 2 and 3, an adjustable elastic strap mechanism, generally indicated at 76, is provided to retain the hanging clothes close to the inner panel 28 while the deck lid 14 is pivoted to the horizontal position. The elastic strap mechanism 76 includes a right-hand track 80, a left-hand track 82, and an elastic strap 84 that extends between the right-hand track 80 and the left-hand track 82. As best seen in FIG. 4, the right-hand track 80 is of plastic molded construction and includes a plurality of integrally molded Christmas tree fasteners 85 that push through apertures in the inner panel 28 to mount the right-hand track 80 on the inner panel 28. Likewise, the left-hand track 82 is of molded plastic construction and includes integrally molded Christmas tree fasteners 86 that push through apertures in the inner panel 28 to thereby mount the left-hand track 82 on the inner panel 28.

The left-hand track 82 includes opposed lips 88 and 90 that define a slot 92. The elastic strap 84, which can be a rubber band or a bungee type cord, has an enlarged end 96 that is captured between the opposed lips 88 and 90. The enlarged end 96 can slide up and down between the opposed lips 88 and 90 within the slot 92 of the left-hand track 82. In addition, as seen in FIG. 4, the elastic strap 84 carries a hook 100 that hooks over a flange 104 that extends continuously along the length of the right-hand track 80. Thus, as seen in FIGS. 3 and 4, the elastic strap 84 can be stretched across the hanging clothes and the hook 100 is hooked onto the flange 104 of the right-hand track 80. In addition, the height of the elastic strap 84 can be adjusted up and down on the tracks 80 and 82, either closer to or further away from the peg 34 to accommodate the varying length of the clothing that is hanging from the hanger 32.

Referring again to FIG. 1, it will be understood that when the deck lid 14 is pivoted down to the horizontal position, the length of the clothing may be such that part of the clothing will be hanging down vertically within the trunk, while the remainder of the clothing and hanger 32 will be stored in close fitting relationship with the inner panel 28 of the deck lid as established by the elastic strap 84.

Thus it is seen that the invention provides a new and improved device for hanging clothes in the trunk of the vehicle body.

What is claimed is:

1. A hanger device for a vehicle body deck lid that pivots between an open vertical position and a horizontal closed position to enable the hanging of clothes stored on a clothes hanger having a wire hook portion and a triangle-shape hanger portion including right and left shoulder supports and a trouser bar, said hanger device comprising:
    a peg projecting from an inner surface of the deck lid for engagement by the hook portion of the clothes hanger when the deck lid is open so that the clothes hanging on the clothes hanger hang downwardly;
    and an elastic strap having first and second ends, one end attached to the deck lid on one side of the hanging clothes and the other end attached to the deck lid on the other side of the hanging clothes so that the elastic strap holds the clothes against the deck lid during movement of the deck lid between open and closed positions,
    retaining blocks located adjacent the peg and engageable by the shoulder supports of the clothes hanger to prevent upward movement of the clothes hanger in the direction to dislodge the hook portion from the peg.

2. The hanger device of claim 1 further comprising the retaining blocks having an opening for receiving the hanger hook portion and a catch for pivoting into a catch position in which the clothes hanger is prevented from removal from the opening of the retaining blocks.

3. The hanger device of claim 1 further comprising one end of the elastic strap being attached to the deck lid by a hook so that the one end of the elastic strap can be unhooked from the deck lid to disengage the elastic strap from holding the clothes against the deck lid.

4. The hanger device of claim 1 further comprising the first and second ends of the elastic strap being mounted on the deck lid by tracks so that the elastic strap can be adjusted between positions closer or further away from the peg to accommodate clothes of different sizes.

5. The hanger device of claim 4 further comprising the tracks including one of the tracks defining a continuous slot and one end of the elastic strap having an enlarged end that is captured in the slot but able to slide within the slot to obtain the adjustment of the elastic strap between positions closer or further away from the peg to accommodate clothes of different sizes.

6. The hanger device of claim 4 further comprising the tracks including one of the tracks having a continuous extending flange thereon and the elastic strap having a hook on one end thereof that hooks onto the flange.

7. The hanger device of claim 4 further comprising the tracks including one of the tracks defining a continuous slot and the elastic strap having an integral enlargement on the end that is captured in the slot but able to slide within the slot, and the other of the tracks having a continuous extending flange thereon and the elastic strap having a hook on the end thereof that hooks onto the flange.

8. The hanger device of claim 7 further comprising a catch to prevent the clothes hanger from being dislodged from the peg and retaining blocks located adjacent the peg and engageable by the shoulder supports of the hanger to prevent upward movement of the hanger in the direction to dislodge the hook portion from the peg.

9. A hanger device for a vehicle body deck lid that pivots between an open vertical position and a horizontal closed position to enable the hanging of clothes stored on a clothes hanger having a wire hook portion and a triangle-shape hanger portion including right and left shoulder supports and a trouser bar, said hanger device comprising:
    a peg projecting from an inner surface of the deck lid for engagement by the hook portion of a clothes hanger when the deck lid is open so that the clothes hanging on the clothes hanger hang downwardly;
    a catch to prevent the clothes hanger from being dislodged from the peg;
    retaining blocks located adjacent the peg and engageable by the shoulder supports of the clothes hanger to prevent upward movement of the hanger in the direction to dislodge the hook portion from the peg;
    and an elastic strap having first and second ends, one end attached to the deck lid on one side of the hanging clothes and the other end attached to the deck lid on the other side of the hanging clothes so that the elastic strap holds the clothes against the deck lid during movement of the deck lid between open and closed positions.

10. The hanger device of claim 9 further comprising one end of the elastic strap being attached to the deck lid by a hook so that the one end of the elastic strap can be unhooked from the deck lid to disengage the elastic strap from holding the clothes against the deck lid.

11. The hanger device of claim 9 further comprising the first and second ends of the elastic strap being mounted on the deck lid by tracks so that the elastic strap can be adjusted between positions closer or further away from the peg to accommodate clothes of different sizes.

12. The hanger device of claim 11 further comprising the tracks including one of the tracks defining a continuous slot and the elastic strap having an enlargement on the end that is captured in the slot but able to slide within the slot to obtain the adjustment of the elastic strap between positions closer or further away from the peg to accommodate clothes of different sizes.

13. The hanger device of claim 11 further comprising the tracks including one of the tracks having a continuous extending flange thereon and the elastic strap having a hook on the end thereof that hooks onto the flange.

14. The hanger device of claim 11 further comprising the tracks including one of the tracks defining a continuous slot and the elastic strap having an enlargement on the end that is captured in the slot but able to slide within the slot, and the other of the tracks having a continuous extending flange thereon and the elastic strap having a hook on the end thereof that hooks onto the flange.

15. A hanger device for a vehicle body deck lid that pivots between an open vertical position and a horizontal closed position to enable the hanging of clothes stored on a clothes hanger having a wire hook portion and a triangle-shape hanger portion including right and left shoulder supports and a trouser bar, said hanger device comprising:

a peg projecting from the inner surface of the deck lid for engagement by the hook portion of the clothes hanger when the deck lid is open so that the clothes hanging on the clothes hanger hang downwardly;

and an elastic strap having first and second ends, one end attached to the deck lid on one side of the hanging clothes and the other end having a hook hooked to the deck lid on the other side of the hanging clothes so that the elastic strap holds the clothes against the deck lid during movement of the deck lid between open and closed positions until unhooked to permit removal of the clothes hanger from the deck lid;

first and second retaining blocks located adjacent the peg on opposite sides thereof and defining an opening receiving the hook portion of the hanger, said retaining blocks respectively engaging the left and right shoulder supports of the hanger to prevent upward movement of the hanger in the direction to dislodge the hook portion from the peg; and a catch pivotally mounted on one of the retaining blocks and pivoting to close the opening between the retaining blocks to prevent the clothes hanger being dislodged from the peg.

16. The hanger device of claim 15 further comprising the first and second ends of the elastic strip being mounted on the deck lid by tracks so that the elastic strap can be adjusted between positions closer or further away from the peg to accommodate clothes of different sizes.

17. The hanger device of claim 16 further comprising the tracks including one of the tracks defining a continuous slot and the elastic strap having an enlargement on the end that is captured in the slot but able to slide within the slot to obtain the adjustment of the elastic strap between positions closer or further away from the peg to accommodate clothes of different sizes.

18. The hanger device of claim 16 further comprising the tracks including one of the tracks having a continuous extending flange thereon and the elastic strap having a hook on the end thereof that hooks onto the flange.

19. The hanger device of claim 16 further comprising the tracks including one of the tracks defining a continuous slot and the elastic strap having an enlargement on the end that is captured in the slot but able to slide within the slot to obtain the adjustment of the elastic strap between positions closer or further away from the peg to accommodate clothes of different sizes, and one of the tracks including one of the tracks having a continuous extending flange thereon and the elastic strap having a hook on the end thereof that hooks onto the flange.

* * * * *